Figure 4:
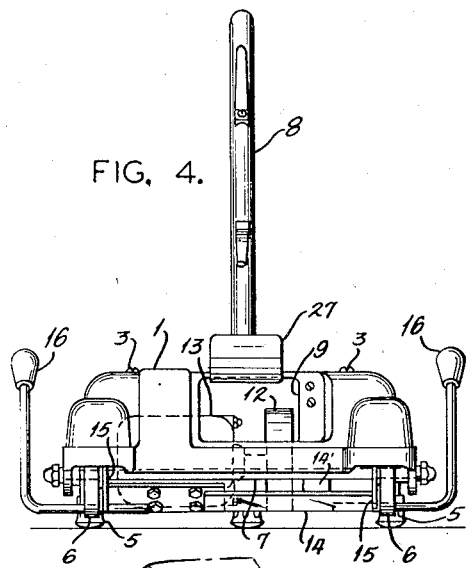

Aug. 21, 1951     L. HUNTER, JR     2,565,233
WHEEL SPINNER FOR AUTOMOBILE WHEELS
Filed Sept. 3, 1948     3 Sheets-Sheet 1
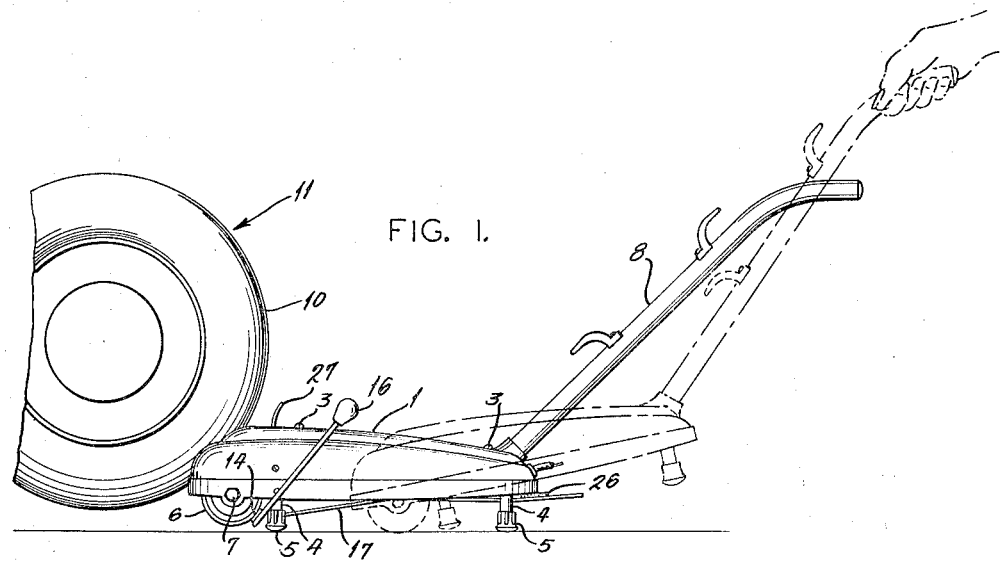
FIG. 1.
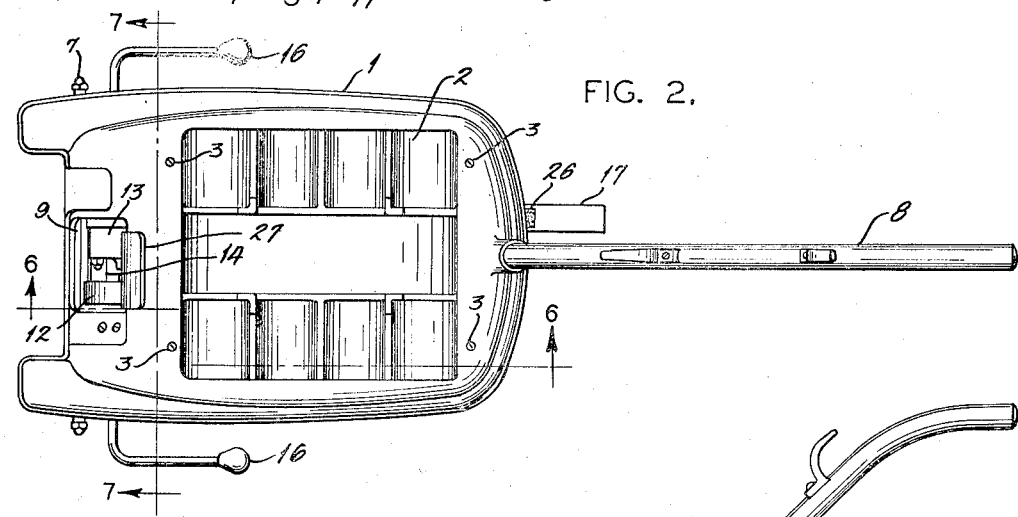
FIG. 2.
FIG. 3.
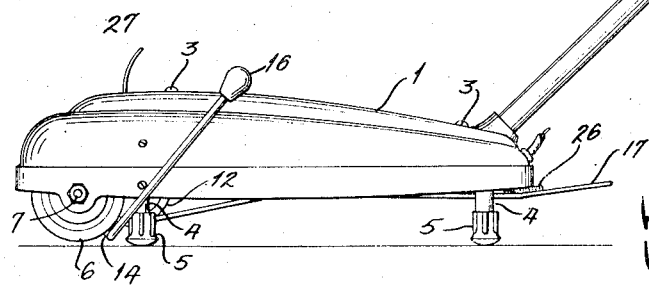
INVENTOR:
Lee Hunter, Jr.
by Carr Marr & Gravely
HIS ATTORNEYS.

Aug. 21, 1951 L. HUNTER, JR 2,565,233
WHEEL SPINNER FOR AUTOMOBILE WHEELS
Filed Sept. 3, 1948 3 Sheets-Sheet 2

INVENTOR:
Lee Hunter, Jr.
by Caro Farr & Gravely
HIS ATTORNEYS.

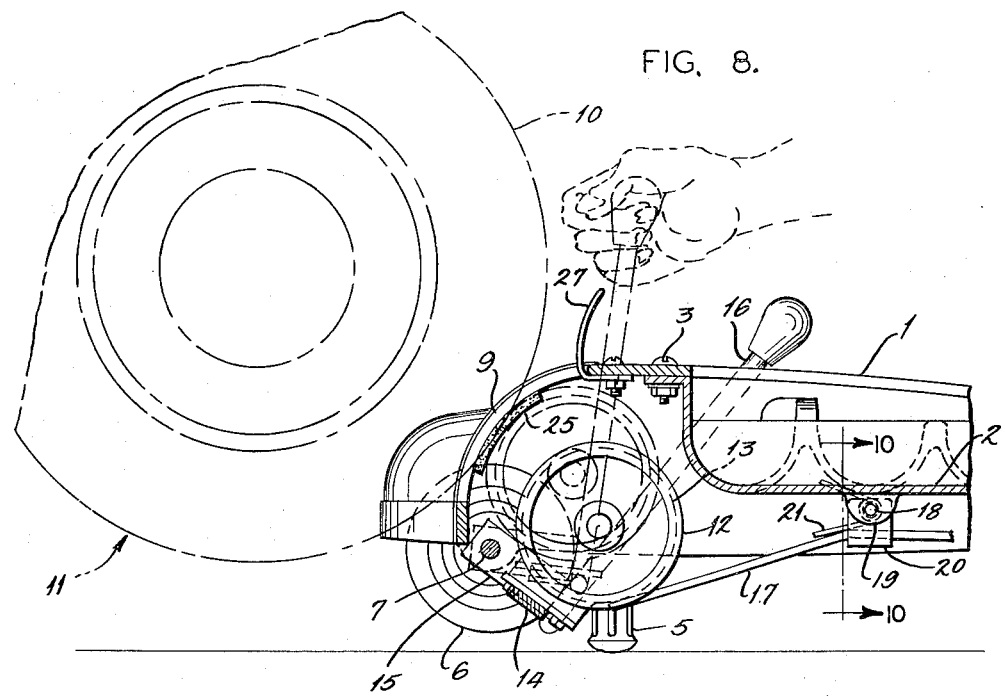
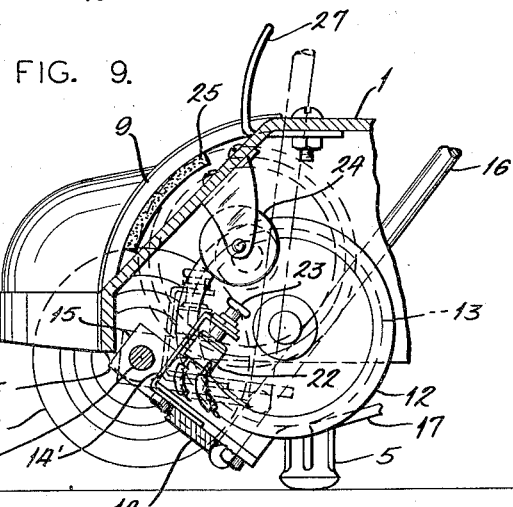
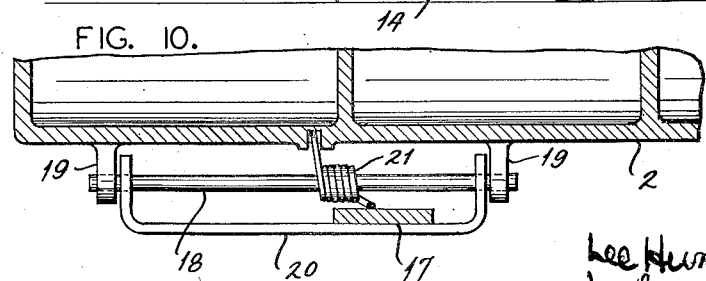

Patented Aug. 21, 1951

2,565,233

UNITED STATES PATENT OFFICE 2,565,233

WHEEL SPINNER FOR AUTOMOBILE WHEELS

Lee Hunter, Jr., University City, Mo.

Application September 3, 1948, Serial No. 47,625

13 Claims. (Cl. 74—16)

This invention relates to automotive service equipment and more particularly to a mechanism that can be quickly associated with one of the mounted wheels of an automobile for the purpose of spinning it in balancing operations.

This mechanism is of the type which consists of a portable frame having means thereon, whereby it can be held stationary after the operative parts thereof have been brought into engagement with the jacked up wheel of an automobile and can be transported easily from one place to another. It also includes a friction drive wheel that is rotated by an electric motor controlled by a switch that is automatically closed when the friction drive wheel is brought into contact with the automobile wheel.

The object of this invention is to provide a portable structure containing a driving mechanism for spinning an automobile wheel in the process of balancing the wheel.

Another object of the invention is to provide a portable frame having a motor driven friction drive wheel that lies opposite an aperture in the frame through which the tire of an automobile wheel may project for engagement therewith and when the friction drive wheel is tilted into engagement with the automobile wheel, will spin it for balancing operations.

Still another object of the invention is to provide a wheel spinning mechanism that contains a receptacle for counter-weights and other tools used in wheel balancing operations and that is easily moved from one position to another and, therefore, readily moved from one automobile wheel to another until all the wheels have been balanced.

Figure 5:
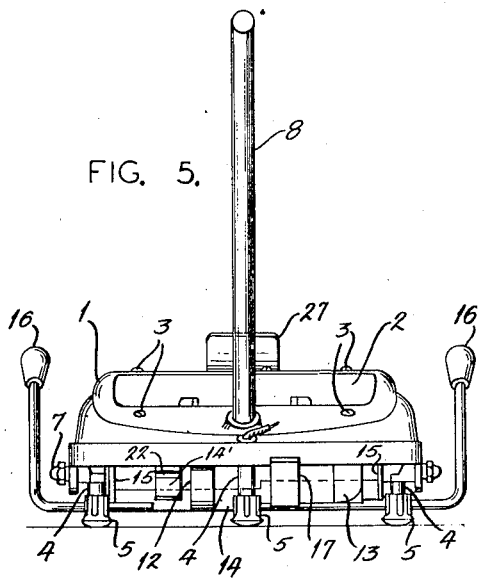
Figure 6:
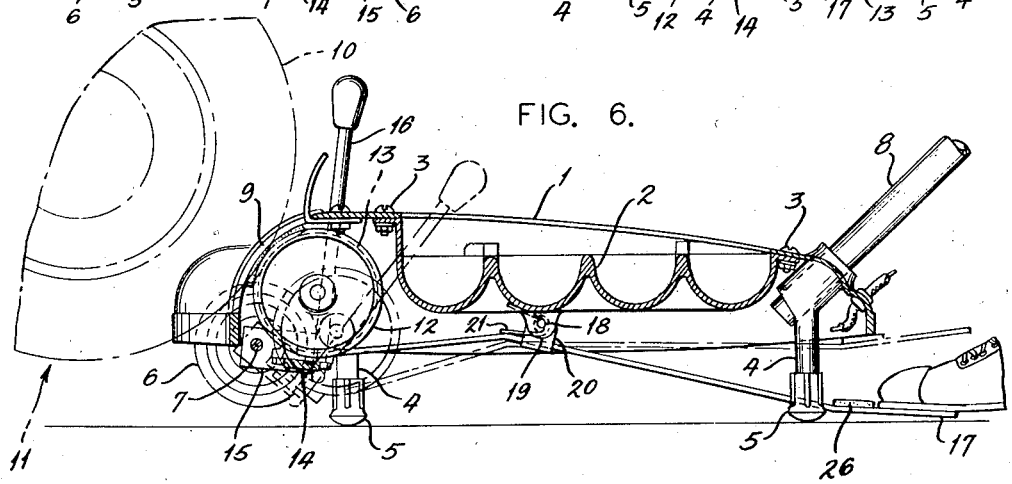
Figure 7:
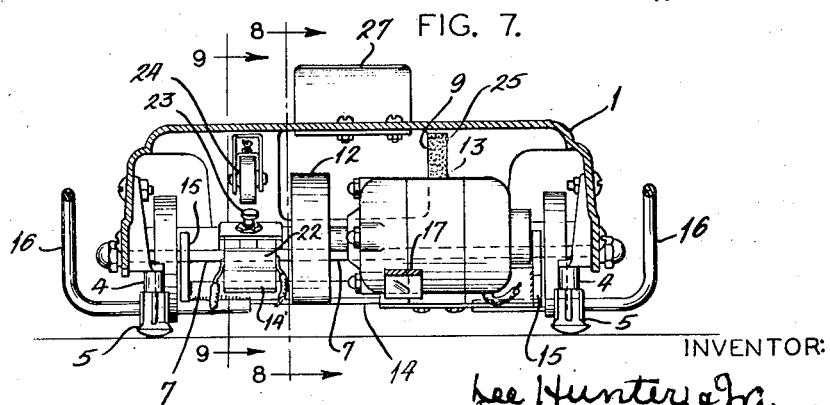

In the drawings:

Fig. 1 is a side elevational view showing the device embodying the invention in operative relation to an automobile wheel, Fig. 2 is a plan view of the device, Fig. 3 is a side elevational view of the device, Fig. 4 is a front elevational view of the wheel spinning device, Fig. 5 is a rear elevational view of the wheel spinning device, Fig. 6 is a section view taken substantially along the line 6—6 of Fig. 2 and with the wheel spinning mechanism in retracted and in wheel engaging positions, Fig. 7 is a section view taken substantially along the line 7—7 of Fig. 2, Fig. 8 is an enlarged section view taken substantially along the line 8—8 of Fig. 7 with the parts illustrated in retracted and in wheel engaging positions, Fig. 9 is a section view taken substantially along the line 9—9 of Fig. 7 with the parts in retracted and in wheel engaging positions; and Fig. 10 is a detail section view taken substantially along the line 10—10 of Fig. 8.

The invention is illustrated in the above drawings, and is especially adapted for use with the device illustrated in my co-pending application Serial No. 744,887, filed April 30, 1947, for Wheel Balancing Device. The structure consists of an open frame 1 provided with a removable receptacle 2 that has a plurality of pockets formed therein for tools and parts. The receptacle is held in position in the central opening in the frame by means of a plurality of screws 3.

Suitably secured to the lower side of the frame are supports 4, there being three in number, two at the forward end of the frame and one at its rear. Each of the supports is provided with a rubber cap or tread member 5 to insure stability of the device and to prevent sliding or skidding along the floor. The device rests upon the several supports 4 during operation.

The frame is moved about the floor or other supporting surface on a pair of suitable rollers 6 rotatably supported in the forward end of the frame 1 on a shaft 7. The rollers are disengaged from the floor when the device is standing on the supports 4 and 5; and when it is transported, it is tipped upwardly and forwardly, as shown in dotted lines in Fig. 1, on the forward supports 4 by means of a handle 8, suitably secured in the end of the frame 1 opposite rollers 6, until the rollers 6 touch the floor, whereupon the device may be maneuvered into any desired position by handle 8.

The frame 1 is provided with an aperture 9 at its forward end which is of proper size and shape to receive a portion of the tread 10 of an automotive tire 11. Within said aperture 9 is a friction drive wheel 12 which is rotated by means of a suitable prime mover, such as an electric motor 13, the friction drive wheel 12 being preferably mounted on the armature shaft of motor 13. The motor 13 is mounted on a support 14 that is secured to brackets 15 pivotally mounted on the shaft 7. One end of a pair of hand crank handles 16 is secured to each end of the support 14, as by welding, and each crank extends to a distance beyond the sides of the device so that it may be bent at right-angles to the shaft 7 to form the handle of the crank. The cranks, when rotated, tilt the support 14 and brackets 15 about the shaft 7 in order to bring the friction drive wheel 12 into engagement with the tread 10 of tire 11.

The support 14 and brackets 15 also may be tilted by a foot pedal 17 that is pivotally mounted on a shaft 18 held in brackets 19, the foot pedal 17 being secured to a U-shaped bracket 20 pivotally supported on the shaft 18. A return spring 21 on shaft 18 engages the lever 17 at its one end and the bottom of the receptacle 2 at its other end, which spring returns the pedal 17 to its normal position when not in use, as shown in Fig. 3.

A switch 22 is secured to the support 14 by means of a suitable bracket 14'. The switch operating plunger 23 is positioned to engage a caster 24 secured to the frame 1 and in alignment with the switch operating plunger 23.

Interiorly disposed in frame 1 at its forward end and opposite the frame of motor 12 is a bumper pad 25 that is engaged by the frame of the motor 12 in order to prevent metal-to-metal contact between the motor and the frame to prevent breakage of one or the other, as well as other damage. The lever 17 is likewise equipped with a bumper pad 26 for similar reasons. A guard 27 is secured along one edge of opening 9 to prevent the placing of the device too far under the tire 11 and to serve as a brake to stop spinning of the vehicle wheel.

During the operation of the device, the tool receptacle is equipped with the necessary tools and counterweights used in balancing wheels. After the automobile tire 11 has been jacked up from the floor, the device is maneuvered about from its stationary position on supports 4 by grasping the handle 8 and moving it upward and forward until rollers 6 are in contact with the floor, thereby making the device portable, it being then rolled into position on rollers 6 so that the tire is aligned with the friction drive wheel 12. The device is then permitted to rest on the supports 4. The friction drive wheel 12 is now brought into engagement with the tire 11 by rotating crank 16 forwardly or depressing foot pedal 17 which pivots the motor 13 and support 14 forward and upward, thereby moving the friction drive wheel 12 forward and upward into its tire engaging position. During the tilting motion, the switch operating plunger 23 is depressed when brought into contact with caster 24, thereby closing switch 22 and starting the motor which rotates the friction drive wheel which rotates the tire 11 on the automobile wheel. The reverse tilting of frame 14 by means of handle 16 or foot pedal 17 stops the motor by causing the switch operating plunger 23 to be rotated away from caster 24, thereby opening switch 22. Thereafter the device may be removed from the tire by tilting it upward and forward by means of handle 8 until rollers 6 touch the floor, as shown in Fig. 1, thereby enabling it to be moved to another wheel for a subsequent testing operation.

What I claim is:

1. A wheel spinning device comprising a frame; means secured to said frame for stationarily supporting said frame; wheels on said frame for movably supporting said frame; a second frame pivotally supported in said frame; a motor supported on said second frame; means operable by said motor for spinning the wheel; manually actuated means for bringing said means operable by said motor into engagement with the wheel; and means responsive to the tilting of said second frame for controlling the operation of said motor.

2. A wheel spinning device comprising a frame having an aperture therein for receiving the periphery of a wheel; means for stationarily supporting said frame; means for supporting said frame for movement from one location to another; a motor support tiltably mounted in said frame; a motor mounted on said support; wheel engaging means driven by said motor and arranged on one side of said aperture; hand operated means for tilting said wheel engaging means toward said aperture for engagement with the wheel; foot operated means for tilting said means into engagement with the wheel; and means responsive to the tilting of said frame for initiating rotation in said motor.

3. A wheel spinning device comprising a frame having an aperture therein for receiving the periphery of a wheel; means for stationarily supporting said frame; means for supporting said frame for movement from one location to another; a motor support tiltably mounted in said frame; a motor mounted on said support; wheel engaging means driven by said motor and arranged on one side of said aperture; hand operated means for tilting said wheel engaging means toward said aperture for engagement with the wheel; and means responsive to the tilting of said frame for initiating rotation in said motor.

4. A wheel spinning device comprising a frame having an aperture therein for receiving the periphery of a wheel; means for stationarily supporting said frame; means for supporting said frame for movement from one location to another; a motor support tiltably mounted in said frame; a motor mounted on said support; wheel engaging means driven by said motor and arranged on one side of said aperture; foot operated means for tilting said wheel engaging means toward said aperture for engagement with the wheel; and means responsive to the tilting of said frame for initiating rotation in said motor.

5. A wheel spinning device comprising a frame having an aperture therein for receiving the tread of said wheel; a motor support tiltably mounted in said frame; a motor provided with a shaft and mounted on said support; wheel driving means mounted on said shaft and opposite said aperture; a hand operated means and a foot operated means selectively operable for bringing said wheel driving means into engagement with the wheel; a switch mounted on said support; and switch engaging means mounted on said frame engaged by said switch when said support is tilted.

6. A wheel spinning device comprising a frame having an aperture therein for receiving the tread of said wheel; a motor support tiltably mounted in said frame; a motor provided with a shaft and mounted on said support; wheel driving means mounted on said shaft and opposite said aperture; a hand operated means for bringing said wheel driving means into engagement with the wheel; a switch mounted on said support; and switch engaging means mounted on said frame engaged by said switch when said support is tilted.

7. A wheel spinning device comprising a frame having an aperture therein for receiving the tread of said wheel; a motor support tiltably mounted in said frame; a motor provided with a shaft and mounted on said support; wheel driving means mounted on said shaft and opposite said aperture; a foot operated means for bringing said wheel driving means into engagement with the wheel; a switch mounted on said support; and switch engaging means mounted on said frame engaged by said switch when said support is tilted.

8. A wheel spinning device comprising a frame having an aperture therein for receiving the tread of said wheel; a tool receptacle supported in said frame; a motor support tiltably mounted in said frame; a motor provided with a shaft and mounted on said support; wheel driving means mounted on said shaft opposite said aperture; a hand operated means and a foot operated means selectively operable for bringing said wheel driving means into engagement with the wheel; a switch mounted on said support; and switch engaging means mounted on said frame engaged by said switch when said support is tilted.

9. A wheel spinning device comprising a frame having an aperture therein for receiving the tread of said wheel; a tool receptacle supported in said frame; a motor support tiltably mounted in said frame; a motor provided with a shaft and mounted on said support; wheel driving means mounted on said shaft opposite said aperture; a hand operated means for bringing said wheel driving means into engagement with the wheel; a switch mounted on said support; and switch engaging means mounted on said frame engaged by said switch when said support is tilted.

10. A wheel spinning device comprising a frame having an aperture therein for receiving the tread of said wheel; a tool receptacle supported in said frame; a motor support tiltably mounted in said frame; a motor provided with a shaft and mounted on said support; wheel driving means mounted on said shaft opposite said aperture; a foot operated means for bringing said wheel driving means into engagement with the wheel; a switch mounted on said support; and switch engaging means mounted on said frame engaged by said switch when said support is tilted.

11. A wheel spinning device comprising a frame; means secured to said frame for stationarily supporting said frame; wheels on said frame for movably supporting said frames; a second frame pivotally supported in said frame; a motor supported on said second frame; a friction drive wheel operable by said motor for spinning the wheel; hand-actuated means for bringing said friction drive wheel into engagement with the wheel; foot-actuated means for bringing said gear into engagement with said wheel; and means responsive to the tilting of said second frame for controlling the operation of said motor.

12. A wheel spinning device comprising a frame; means secured to said frame for stationarily supporting said frame; wheels on said frame for movably supporting said frame; a second frame pivotally supported in said frame; a motor supported on said second frame; a friction drive wheel operable by said motor for spinning the wheel; hand-actuated means for bringing said friction drive wheel into engagement with the wheel; and means responsive to the tilting of said second frame for controlling the operation of said motor.

13. A wheel spinning device comprising a frame; means secured to said frame for stationarily supporting said frame; wheels on said frame for movably supporting said frame; a second frame pivotally supported in said frame; a motor supported on said second frame; a friction drive wheel operable by said motor for spinning the wheel; foot-actuated means for bringing said wheel into engagement with said wheel; and means responsive to the tilting of said second frame for controlling the operation of said motor.

LEE HUNTER, JR.

REFERENCES CITED

The following references are of record in the file of this patent:

UNITED STATES PATENTS

| Number | Name | Date |
| --- | --- | --- |
| 1,418,007 | Lustig | May 30, 1922 |
| 2,018,160 | Weaver | Oct. 22, 1935 |
| 2,347,275 | Merrill | Apr. 25, 1944 |

FOREIGN PATENTS

| Number | Country | Date |
| --- | --- | --- |
| 608,449 | France | July 27, 1926 |